United States Patent [19]

Wang

[11] Patent Number: 4,859,893

[45] Date of Patent: Aug. 22, 1989

[54] COMMUTATOR WITH RESILIENTLY CLAMPED RESISTOR RING

[75] Inventor: Patrick S. Wang, Repulse Bay, Hong Kong

[73] Assignee: Johnson Electric Industrial Manufactory Limited, Chaiwan, Hong Kong

[21] Appl. No.: 171,273

[22] Filed: Mar. 21, 1988

[30] Foreign Application Priority Data

Mar. 23, 1987 [GB] United Kingdom ................. 8706844

[51] Int. Cl.$^4$ ...................... H02K 13/06; H02K 13/04
[52] U.S. Cl. ..................................... 310/234; 310/42; 310/220; 29/597
[58] Field of Search ..................... 29/597, 598; 310/42, 310/43, 71, 89, 91, 219, 220, 222, 227, 232, 233, 234, 235, 228; 361/399

[56] References Cited

U.S. PATENT DOCUMENTS

| | | | |
|---|---|---|---|
| 3,487,248 | 12/1969 | Kaneko et al. | 310/220 |
| 4,322,650 | 3/1982 | Mabuchi | 310/220 |
| 4,469,972 | 9/1984 | Rampignon et al. | 310/42 |
| 4,725,923 | 2/1988 | Mylne, III | 361/399 |

FOREIGN PATENT DOCUMENTS 0090685 10/1983 European Pat. Off. .
2183933 6/1987 United Kingdom .
2189353 10/1987 United Kingdom .

Primary Examiner—Patrick R. Salce
Assistant Examiner—D. L. Rebsch
Attorney, Agent, or Firm—Fleit, Jacobson, Cohn, Price, Holman & Stern

[57] ABSTRACT

A resistor ring, typically a varistor, is clamped in intimate contact with terminals of a commutator using a clip-on plastic clamp having a plurality of shock-absorbing spring fingers, thus avoiding the application of heat which could damage the resistor ring.

7 Claims, 2 Drawing Sheets

COMMUTATOR WITH RESILIENTLY CLAMPED RESISTOR RING

INTRODUCTION

This invention relates to an armature for an electric motor and to an electric motor having such an armature.

BACKGROUND

It is known to solder a resistor ring, typically a non-linear resistor ring, such as a varistor, to commutator tangs of an electric motor so that resistor elements are connected between pairs of adjacent commutator segments. These resistor elements serve to discharge inductive energy from the winding coils and thus reduce electrical noise.

However, varistors and indeed some other types of resistor are made by a sintering process and are by their very nature extremely brittle. They are easily damaged if excessive heat is applied and consequently, it is necessary to be extremely careful when soldering.

SUMMARY OF THE INVENTION

In order to mitigate this drawback the present invention provides an armature for an electric motor, comprising an armature winding, a commutator which has a plurality of commutator segments, each provided with an integral terminal connected to a portion of the armature winding, a resistor ring, and a clip-on clamping member having resilient means urging the resistor ring into contact with the terminals of the commutator.

The term "resistor ring" as used herein is intended to cover a linear resistor ring or a non-linear resistor ring, such as a varistor.

Preferably, the resilient means is in the form of a plurality of shock absorbing spring elements.

Preferably; the clamping member comprises a part which is provided with said resilient means and which bears against the resistor ring, and a plurality of legs, which extend in a direction parallel or substantially parallel to the axis of the armature and which engage with the armature on that side of the resistor ring distal from brush contacting regions of the commutator segments.

Conveniently, the clamping member includes a plurality of integral fan blades, which preferably extend radially outwards from the clamping member.

The invention also provides an electric motor having an armature as set forth above.

THE PREFERRED EMBODIMENT

Figure 1:
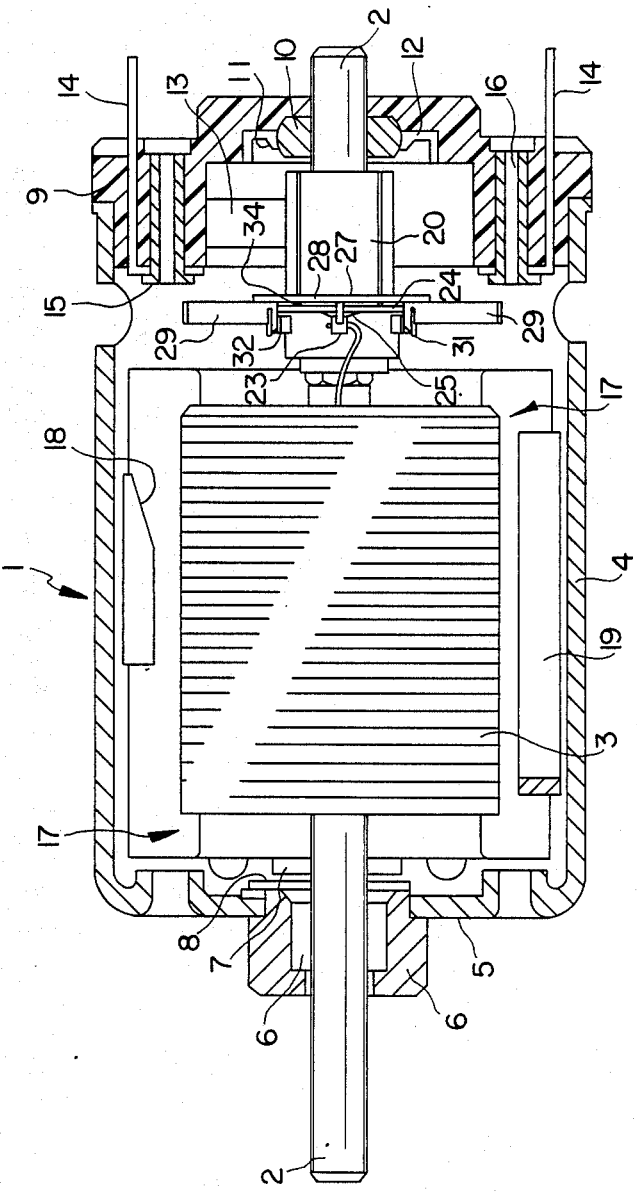
FIG. 1 is a longitudinal cross-section through a permanent magnet direct current motor embodying the invention the armature of the motor not being shown in section.

Referring to FIG. 1, a small, fractional horsepower permanent magnet direct current motor 1 is illustrated. The motor includes an armature comprising a motor shaft 2, an armature stack 3 and a barrel-type commutator 20. The commutator 20 and armature stack 3 are mounted fast on the shaft 2 and the armature stack 3 is wound and the winding is connected to the commutator 20.

The armature is mounted in a cylindrical metal casing 4.

Casing 4 is closed at one end by an integrally formed end plate 5. End plate 5 carries a bearing 6 in a housing 6', the shaft 2 being journalled in the bearing 6. A brass collar 7 is a force fit on the shaft 2 to limit the axial movement of the shaft through bearing 6. A washer 8 is mounted on the shaft 2 between the collar 7 and bearing 6.

A plastic end cap 9, typically of nylon, houses a self aligning sintered bearing 10 which is held in place by axially extending tabs 11 of a washer 12 which is pressed into the end cap. The end cap 9 supports brush gear comprising a pair of carbon brushes (not seen in FIG. 1) which are urged against the commutator 20 by brush leaves 13 (one is seen in FIG. 1) which are connected to power supply tags 14.

The brush leaf/tag assemblies are held on the end cap 9 by rivets 15, 16.

In the example shown the casing 4 carries two permanent magnets 17, which each bear at one axial edge against a respective tang 18 and are urged apart at their other axial edges by a 'U' shape spring 19.

Figure 2:
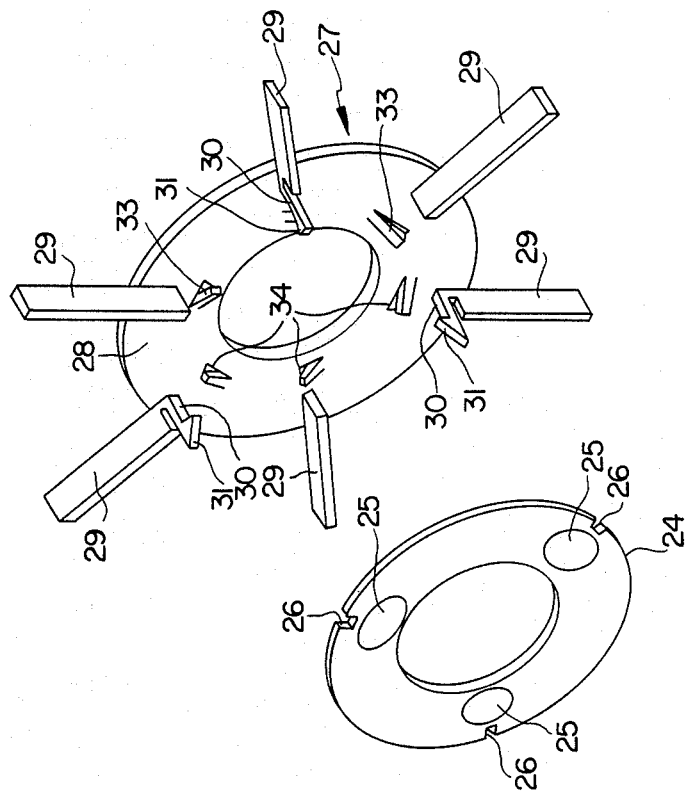
FIG. 2 is an exploded perspective view of part of the armature of the commutator the motor shown in FIG. 1.
Figure 2:
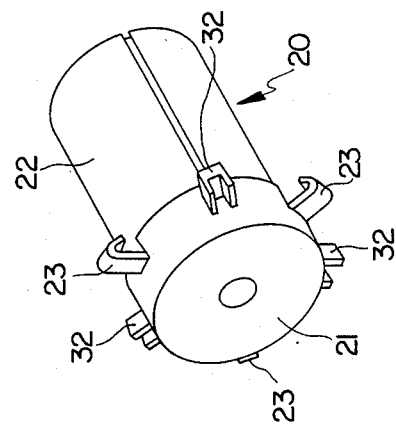

Referring more particularly to FIG. 2, the barrel-type commutator 20 comprises a generally cylindrical commutator base 21 which is mounted fast on the motor shaft 2 (not seen in FIG. 2) and a plurality of commutator segments 22 (three are shown), each provided with an integral terminal in the form of a tang 23. Portions of an armature winding (not seen in FIG. 2) are connected to the tangs 23 by connections which involve the application of heat, e.g. by hot forging or soldering.

A resistor typically in the form of a varistor ring 24 has three silver pads 25 equiangularly spaced apart around the circumference of the ring 24 for contact with the commutator tangs 23. The varistor ring 24 also has three notches 26 aligned with the silver pads 25.

A clip-on clamping member 27 comprises generally a flat annular part 28, a plurality of radially outwardly extending fan blades 29 (six are shown), and three resilient legs 30. The clamping member 27 is formed as a unitary plastic molding and the fan blades 29 extend well beyond the outer edge of the annular part 28.

The legs 30 extend in a direction parallel to the axis of the armature and are radially aligned with alternate fan blades 29. Radially inwardly extending feet 31 on the distal ends of legs 30 engage with U-section lugs 32 extending radially outwardly from the commutator base 21 between the commutator tangs 23 to clip the clamping member 27 onto the commutator and hence to clamp the varistor ring 24 between the annular part 28 and the tangs 23.

A plurality of spring elements in the form of fingers 33 project at an acute angle from the plane of the annular part 28 to bear against the varistor ring 24 and urge the latter into intimate contact with the tangs 23. The fingers 33 serve to absorb shock which may otherwise cause the varistor ring 24 to break.

Apertures 34 in the annular part 28 behind the fingers 33 allow air to be drawn over the varistor ring 24 by the fan blades 29.

The notches 26 in the varistor ring 24 receivce the inner ends of thereof the fan blades 29 when the varistor ring 24 is clamped to the commutator tangs 23 in order to locate the varistor ring 24 angularly with respect to the commutator 20.

The above embodiment is given by way of example only and various modifications will be apparent to persons skilled in the art without departing from the scope of the invention. For example the fan blades 29 could be omitted. Moreover, the resistor ring could be clamped in similar manner to commutator terminals of a type which are provided with a slot straddling and gripping a respective portion of an armature winding and which are located in housings of a terminal support, such as is more particularly described, for example, in our British Pat. No. 2128818B.

What is claimed is:

1. An armature for an electric motor, comprising an armature winding, a commutator which has a plurality of commutator segments each provided with an integral terminal connected to a portion of the armature winding, a resistor ring, and a clip-on clamping member havig resilient means urging the resistor ring into contact with the terminals of the commutator, wherein the clamping member comprises a part, which is provided with said resilient means and which bears against the resistor ring, and a plurality of legs, which extend in a direction substantially parallel to an axis of the armature and which engage with the armature on that side of the resistor ring distal from the commutator segments.

2. An armature as claimed in claim 1, wherein said clamping member is of plastic material.

3. An armature as claimed in claim 1, wherein the resistor ring is a varistor.

4. An armature as claimed in claim 1, wherein each commutator terminal is provided with a slot which straddles and grips a respective portion of the armature winding and wherein the armature includes a terminal support having a plurality of housings in which the terminals are located.

5. An armature for an electric motor, comprising an armature winding, a commutator which has a plurality of commutator segments each provided with an integral terminal connected to a portion of the armature winding, a resistor ring, and a clip-on clamping member having resilient means urging the resistor ring into contact with the terminals of the commutator, wherein the clamping member includes a plurality of integral fan blades.

6. An armature as claimed in claim 5, wherein the fan blades extend radially outwards from the clamping member.

7. An armature as claimed in claim 1, wherein the commutator terminals are in the form of tangs connected to respective portions of the armature winding by connections which involved the application of heat.

* * * * *